US011303540B2

(12) United States Patent
Keller et al.

(10) Patent No.: US 11,303,540 B2
(45) Date of Patent: Apr. 12, 2022

(54) CLOUD RESOURCE ESTIMATION AND RECOMMENDATION

(71) Applicant: CITRIX SYSTEMS, INC., Burlington, MA (US)

(72) Inventors: Steven A. Keller, Coral Springs, FL (US); Sindy Giraldo, For Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/834,757

(22) Filed: Mar. 30, 2020

(65) Prior Publication Data

US 2021/0306233 A1 Sep. 30, 2021

(51) Int. Cl.
*G06F 15/173* (2006.01)
*H04L 41/5041* (2022.01)
*H04L 41/5051* (2022.01)
*G06N 5/04* (2006.01)

(52) U.S. Cl.
CPC .......... *H04L 41/5048* (2013.01); *G06N 5/04* (2013.01); *H04L 41/5051* (2013.01)

(58) Field of Classification Search
CPC .. H04L 41/5048; H04L 41/5051; H04L 47/78
USPC ....................... 709/226, 223, 219
See application file for complete search history.

(56) References Cited

U.S. PATENT DOCUMENTS

| | | | | |
|---|---|---|---|---|
| 2006/0047813 | A1* | 3/2006 | Aggarwal | H04L 67/1029 709/226 |
| 2014/0222613 | A1* | 8/2014 | Ryu | G06Q 30/06 705/26.7 |
| 2014/0280966 | A1* | 9/2014 | Sapuram | H04L 41/5054 709/226 |
| 2016/0036655 | A1* | 2/2016 | Burton | H04L 41/5029 709/223 |
| 2016/0306581 | A1* | 10/2016 | Belgaied | G06F 3/0644 |

* cited by examiner

*Primary Examiner* — Kaylee J Huang
(74) *Attorney, Agent, or Firm* — Mintz Levin Cohn Ferris Glovsky and Popeo, P.C.

(57) ABSTRACT

Data is received characterizing a virtual resource requirement for deployment of a resource in a first remote computing environment and/or a second remote computing environment. Second data is received characterizing resource cost for the first remote computing environment and the second remote computing environment. The receiving the second data includes accessing, via an application programming interface of the first remote computing environment and based on an account identity of an entity associated with the virtual resource requirement, the second data characterizing computing resource cost for the first remote computing environment. A first cost for deploying the resource within the first remote computing environment and a second cost for deploying the resource within the second remote computing environment is predicted using the received data. The first cost and the second cost is provided. Related apparatus, systems, techniques and articles are also described.

19 Claims, 5 Drawing Sheets

CLOUD RESOURCE ESTIMATION AND RECOMMENDATION

TECHNICAL FIELD

The subject matter described herein relates to managing use of cloud resources.

BACKGROUND

Cloud computing can include the on-demand availability of computer system resources, especially data storage and computing power, without direct active management by the user. The term can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

In an aspect, data is received characterizing a virtual resource requirement for deployment of a resource in a first remote computing environment and/or a second remote computing environment. Second data is received characterizing resource cost for the first remote computing environment and the second remote computing environment. The receiving the second data includes accessing, via an application programming interface of the first remote computing environment and based on an account identity of an entity associated with the virtual resource requirement, the second data characterizing computing resource cost for the first remote computing environment. A first cost for deploying the resource within the first remote computing environment and a second cost for deploying the resource within the second remote computing environment is predicted using the received data. The first cost and the second cost is provided.

One or more of the following features can be included in any feasible combination. For example, the predicting can include accessing a database to retrieve a mapping of comparable resource types between the first remote computing environment and the second remote computing environment; and computing, using the mapping, the first cost and the second cost. The data characterizing the virtual resource requirement for deployment can include a resource manager template file specifying at least an object, a type, a name, and a property. A recommendation characterizing which of the first remote computing environment or the second remote computing environment to select for deployment of the resource can be determined based on the first cost and the second cost. The providing can include inserting a recommendation into a pre-deployment state of a resource manager template. The recommendation can further characterize a virtual resource.

The predicting can include determining a first set of resources of the first computing environment that satisfies the virtual resource requirement, the first set of resources associated with at least a first resource type; and determining a second set of resources of the second remote computing environment that satisfies the virtual resource requirement, the second set of resources associated with at least a second resource type. The first resource type and the second resource type can be different. The predicting can include converting the virtual resource requirement into a markup language file specifying a number of required virtual machines, a size of storage, and/or a virtual machine processing capability. The predicting can include determining, for a field within the markup language file, a first resource type of the first remote computing environment that satisfies at least a portion of the virtual resource requirement.

The resource can include a virtual machine, a storage account, a web application, a database, and/or a virtual network. The first remote computing environment can include an infrastructure as a service platform configured to provide application programming interfaces and supporting pools of hypervisors including virtual machines. The application programming interfaces can enable provision of processing, storage, and/or networks to support operating systems and/or applications.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
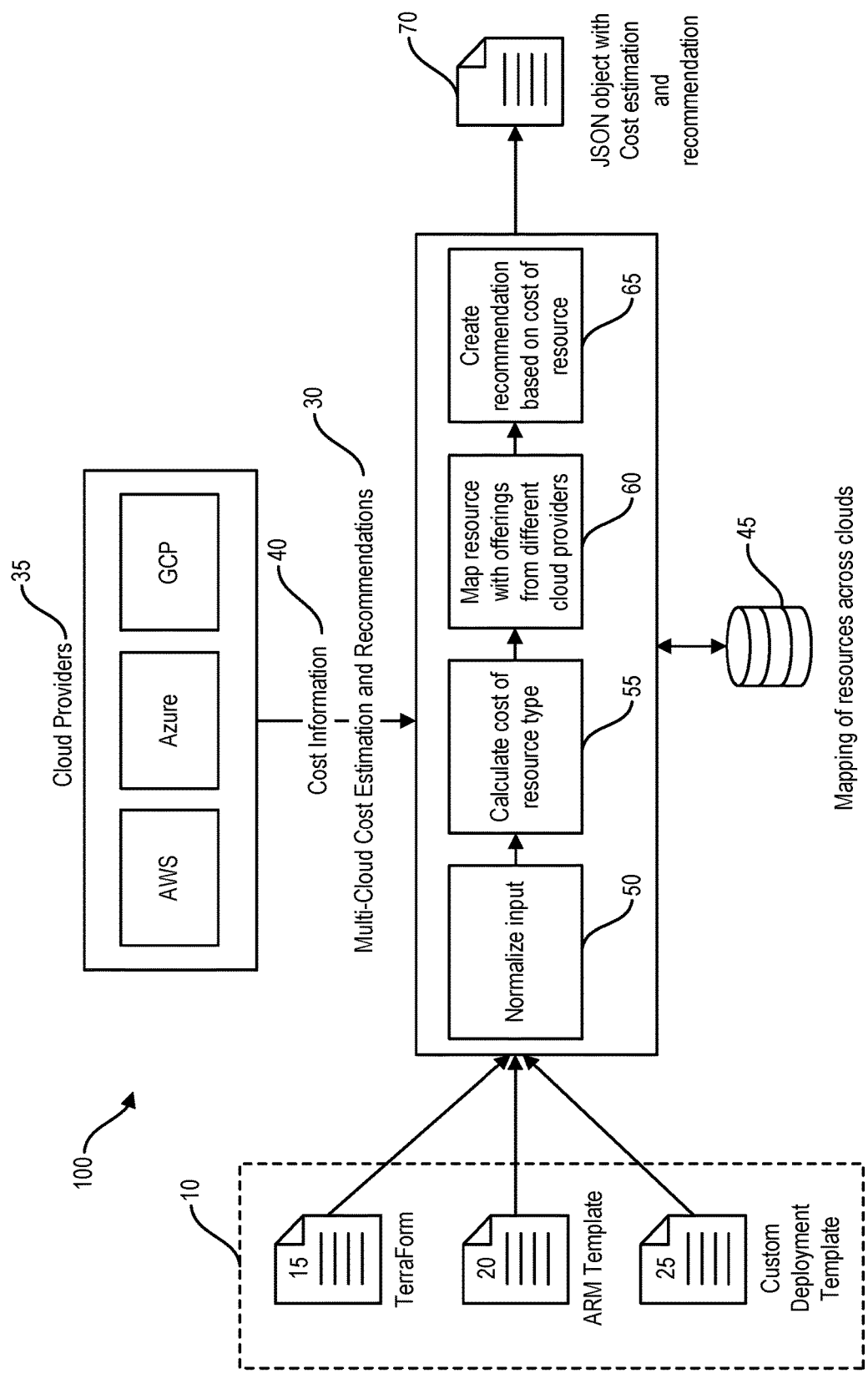
FIG. 1 is a data flow diagram illustrating an example data flow for a process of predicting, prior to deployment, the expected costs for a given cloud resource that can improve utilization of cloud resources and reduce the cost of deployment.

Cloud providers can provide a remote computing environment, for example, with virtual machine (VM) infrastructure such as a hypervisor using native execution to share and manage hardware, allowing for multiple environments which are isolated from one another, yet exist on the same physical machine. The computing environment can include an infrastructure as a service (IaaS) platform that provides application programming interfaces (APIs) to dereference low-level details of underlying network infrastructure. In such an IaaS platform, pools of hypervisors can support large numbers of VMs and include the ability to scale up and down services to meet varying needs. IaaS platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

Cloud resource costs vary based on utilization of the underlying computing resource such as the required percent of central processing unit (CPU) processing time. Prior to deployment of a resource, such as a virtual machine, storage accounts, web applications, databases, virtual networks, and the like, the consumer of the resource requests an amount of resources for a given time period. For example, the consumer may request an amount of physical CPU utilization and number of virtual machines. The cloud provider will then charge a pre-negotiated price for allocating such resources.

But cloud resource deployment costs are dynamic, opaque, and vary among deployment mechanisms and cloud resource providers. And costs may further vary based on individually negotiated rates. This can result in difficulty in pre-deployment understanding of the true cost of deploying cloud resources, which may further result in inefficient and more costly utilization of cloud resources. Moreover, each cloud computing environment may offer different resource types, which may not be directly comparable across cloud providers.

Accordingly, some implementations of the current subject matter include an approach to predicting, prior to deployment, the expected costs for a given cloud resource. The expected costs can be computed for a number of deployment mechanisms (e.g., deployment templates) and for a number of different cloud providers (e.g., Amazon Web Services (AWS), Microsoft Azure, Google Cloud Platform (GCP), and the like). Further, recommendations regarding which cloud provider to utilize can be determined and the prediction can be performed using current pricing specific to the given entity that wants to deploy.

By predicting, prior to deployment, the cost of cloud resources for different deployment mechanisms and different cloud resource providers the current subject matter can improve utilization of cloud resources and reduce the cost of deployment. Moreover, by using current pricing that is specific to a given entity that wants to deploy an application, more accurate predictions are possible.

In some implementations, the current subject matter can provide a mechanism to acquire cost estimations at a resource level and to acquire multi-cloud (e.g., for multiple cloud provides) recommendations based on a resource requirement specified or requested during a pre-deployment phase. Cost estimations can be dynamically calculated based on a specific user (or other entity) cloud account pricing list. For example, the cost estimations can be specific for a given account, which may have uniquely negotiated rates different from other accounts, may have special discounts, reserved instances and/or capacities available to it. Recommendations can be based on the specified resource requirements and the recommendations can take into account equivalent products (e.g., resource types and names) found across different clouds. For example, the current subject matter can take into consideration that a given virtual machine type may not be identical if deployed on a first cloud provider as compared to being deployed on a second cloud provider. Accordingly, some implementations can provide for multi-cloud cost calculations, efficient recommendations, and which can enable a pre-deployment cost evaluation.

In some implementations, a mapping between types of cloud resources offered by each cloud resource provider can enable a more direct cost comparison.

As described herein, a resource (also referred to as a virtual resource) can include any manageable item that is available through a cloud provider such as virtual machines, storage accounts, web applications, databases, and virtual networks. Other resource types are possible.

FIG. 1 is a data flow diagram illustrating an example data flow 100 for a process of predicting, prior to deployment, the expected costs for a given cloud resource that can improve utilization of cloud resources and reduce the cost of deployment. And by using current pricing that is specific to a given entity that wants to deploy an application, more accurate predictions are possible.

A multi-cloud cost estimation and recommendation system 30 can receive one or more deployment mechanisms 10. The deployment mechanisms 10 can characterize virtual resource requirements that are required to be deployed with a cloud provider (e.g., a remote computing environment). These deployment mechanisms 10 can include, for example, one or more of a TerraForm template 15, an Azure Resource Manager (ARM) template 20, or a custom deployment template 25. The deployment mechanisms 10 can be generated, for example, using an infrastructure as code tool (e.g., TerraForm, AWS CloudFormation, and the like) that allows a user to create, update, and version cloud resources (e.g., cloud infrastructure). In some implementations, the deployment mechanisms can include one or more JavaScript Object Notation (JSON) files that allow a user to declare objects, types, names, and properties of desired resources. The JSON file can be checked into source control and managed like any other code file.

As an example, the following is a portion of an example ARM template file related to resources that would be defined and/or deployed. The resources portion of the ARM template can take the following structure:

```
"resources": [
  {
    "condition": "<true-to-deploy-this-resource>",
    "type": "<resource-provider-namespace/resource-type-name>",
    "apiVersion": "<api-version-of-resource>",
    "name": "<name-of-the-resource>",
    "comments": "<your-reference-notes>",
```

```
            "location": "<location-of-resource>",
            "dependsOn": [
                "<array-of-related-resource-names>"
            ],
            "tags": {
                "<tag-name1>": "<tag-value1>",
                "<tag-name2>": "<tag-value2>"
            },
            "sku": {
                "name": "<sku-name>",
                "tier": "<sku-tier>",
                "size": "<sku-size>",
                "family": "<sku-family>",
                "capacity": <sku-capacity>
            },
            "kind": "<type-of-resource>",
            "copy": {
                "name": "<name-of-copy-loop>",
                "count": <number-of-iterations>,
                "mode": "<serial-or-parallel>",
                "batchSize": <number-to-deploy-serially>
            },
            "plan": {
                "name": "<plan-name>",
                "promotionCode": "<plan-promotion-code>",
                "publisher": "<plan-publisher>",
                "product": "<plan-product>",
                "version": "<plan-version>"
            },
            "properties": {
                "<settings-for-the-resource>",
                "copy": [
                    {
                        "name": ,
                        "count": ,
                        "input": { }
                    }
                ]
            },
            "resources": [
                "<array-of-child-resources>"
            ]
        }
    ]
```

The multi-cloud cost estimation and recommendation system 30 can also receive cost information 40 from multiple cloud providers 35. The cloud providers 35 can include, for example, Amazon Web Services (AWS), Azure, Google Cloud Platform (GCP), and/or any other remote computing platform that can provide for the on-demand availability of computer system resources such as data storage and computing power and without direct active management by the user.

The cost information can be dynamically calculated based on a specific user (or other entity) cloud account pricing list. For example, the cost estimations can be specific for a given account, which may have uniquely negotiated rates different from other accounts, may have special discounts, reserved instances and/or capacities available to it. Accordingly, in some implementations, the cost information can be received by retrieving the cost information via an application programing interface (API) of the cloud providers 35. The API can include, for example, a representational state transfer (REST) API. Other example APIs include Microsoft Azure's Enterprise APIs including reporting APIs, consumption APIs, and helper APIs; Amazon Web Services (AWS) Athena; and Google Cloud's cloud billing APIs.

The account information can include a cloud-based identity and can relate to an access management service of the cloud provider. The account information can include information that enables users of the cloud provider (e.g., information technology (IT) administrators, application developers, etc.) to access (e.g., sign into) the cloud provider and access resources. For example, the account information can relate to a user with a username and password, applications, or other servers that might require authentication through secret keys or certificates, and the like.

The multi-cloud cost estimation and recommendation system 30 can also receive mappings of resources between cloud providers from a database 45. The mappings of resources between cloud providers can characterize equivalent products (e.g., resource types and names) found across different clouds. For example, the mappings can characterize that a given virtual machine type may not be identical if deployed on a first cloud provider as compared to being deployed on a second cloud provider. The mapping between types of cloud resources offered by each cloud resource provider can enable a more direct cost comparison.

Pricing data can be obtained from the cloud provider and includes resource type as well as capabilities. As updates are made to the pricing data (and types of resources) the resource map can be updated.

The following is an example class definition for mapping of cloud resources. A dictionary can be used with a main key being the resource category, which can roll-up cloud resources of different types from different providers. Selecting the element from the dictionary matching the resource category can result in a list of similar resources. In some implementations, price is not included in the mapping as it can change dynamically so the mapping can be used to find matching resources, then the price can be obtained dynamically from the cloud provider. In some implementations, cost can be included in the mapping and is refreshed periodically. The example class definition for mapping of cloud resources includes:

```
class CloudResource
{
    string CloudProvider {get; set; }
    string OS {get; set; }
    string ResourceCategory {get; set}
    string CloudResourceDefinition {get; set; }
    string Region {get; set; }
    string Capabilities {get; set; }
}
Dictionary<string, List<CloudResource>> cloudResourceDictionary = new Dictionary
{
    {
        "VM", new CloudResourceMap ( )
        {
            "Azure",
            "Windows",
            "D2 v3",
            "EastUs",
            "Cpu:2, RAM:8GB,DISK:50GB"
        }
    },
    "VM", new CloudResourceMap ( )
    {
        "AWS",
        "Windows",
        "t3a.large",
        "EastUs",
        "Cpu:2, RAM:8GB,DISK:50GB"
    },
}
```

The multi-cloud cost estimation and recommendation system 30 can, as indicated at 50, normalize the received data. Normalizing the received data can include processing and/or converting the deployment mechanisms to a markup language file (e.g., extensible markup language). For example, the deployment mechanisms 10 (e.g., the virtual resource requirements) can be converted into a markup language file specifying a number of required virtual machines, a size of storage, a virtual machine processing capability, a deployed geographic region, and/or the like. Other example fields are possible and can correlate to other resource types.

The multi-cloud cost estimation and recommendation system 30 can predict, using the received data, costs for deploying one or more resources that satisfy the resource requirements (as specified in the deployment mechanisms 10) within different cloud providers 35 (e.g., different remote computing environments). The predicting can include, as indicated at 55, calculating the cost of resource types. For example, an estimation of the cost of a resource can be calculated using user account discounts, reserved capacities, and instances. The estimating can be performed, for example, using a fields within the markup language file to determine resource types of each cloud provider 35 that satisfies at least a portion of the virtual resource requirements. Utilizing user specific account information can enable a more accurate cost estimation for each resource.

In some implementations, the multi-cloud cost estimation and recommendation system 30 can determine a set of resources for each cloud provider that satisfies the virtual resource requirements (e.g., as specified in the deployment mechanisms 10). The specific type or types of resources determined can vary between cloud providers 35.

The predicting can include, at 60, mapping resource offerings from different cloud providers. For example, the mapping received from database 45 can characterize comparable resource types between cloud providers 35 and a cost of the resource for each cloud provider 35 can be predicted. By utilizing a mapping characterizing comparable resource types between cloud providers 35, some implementations of the current subject matter can enable a more accurate cost calculation and comparison between cloud providers.

The predicting can include, at 65, determining a recommendation based on the cost of the resources. For example, a recommendation characterizing which of the first remote computing environment or the second remote computing environment to select for deployment of the resource can be determined, for example, based on choosing the lower cost environment. In some implementations, the recommendation can include specifications of the virtual resources to utilize within a given remote computing environment. For example, the recommendation can specify certain virtual resources and parameters (e.g., Cpu:2, RAM:8 GB, DISK: 50 GB).

The multi-cloud cost estimation and recommendation system 30 can output the estimated costs and recommendations, for example, as a JSON object 70. The JSON object 70 can include fields characterizing the estimated costs and recommendations. In some implementations, the JSON object 70 can be inserted into a pre-deployment state of a resource manager template, for example a pre-deployment deployment mechanism 10 such as one of the TerraForm template 15, the ARM template 20, or a custom deployment template 25. This enables the modified template to be further processed by a user, for example, using an infrastructure as code tool (e.g., TerraForm, AWS CloudFormation, etc.) to further refine their template in view of the estimate costs and recommendations.

Once a user takes into consideration the cost estimations and recommendations, the user can cause deployment according to their modified templates. For example, one or more virtual resources, such as VMs, may be deployed to the cloud provider such that the virtual resources are executing application code on physical hardware resources managed by the cloud provider. The cloud provider can be providing a configuration of computing resources for execution of the virtual resources and according to the template. For example, the cloud provider can allocate a certain pre-agreed amount of units of computing resources (e.g., number of VMs, percent of CPU time, disk storage size, and the like) to the one or more VMs to support operation of the VMs within the cloud provider's computing environment. In some implementations, the deployment can be automatically achieved using the output JSON and/or modified templates, for example, where following such recommendation would reduce cost and/or meet other performance metrics.

In some example implementations, the output JSON can include a collection of cloud resource objects, as described previously, for the resources that have been chosen. Ordering and grouping within this file may vary in implementations. For example, ordering and grouping can be chosen to group resources by category, keep in order to better correlate to the input file, and the like. The output can be used for various processes and can be for a report to guide the service owner seeking cost recommendation. The following is an example output JSON file.

```
{
ResourceRecommendations": [
{
    "Azure",
    "Windows",
    "D2 v3",
    "EastUs",
    "Cpu:2, RAM:8GB,DISK:50GB"
}
},
]
}
```

In some implementations, the subject matter described herein may provide technical advantages. For example, the current subject matter can provide insight into the cost of goods of a Cloud based Application. Having a better understanding of the cost of goods and the options available for reducing that cost can ultimately improve profits associated with the Cloud based application. In addition, some implementations of the current subject matter can enable the ability to forecast cost based on running utilization rate and to create an accurate cost model, and to calculate revenue based on cost of resource.

Figure 2:
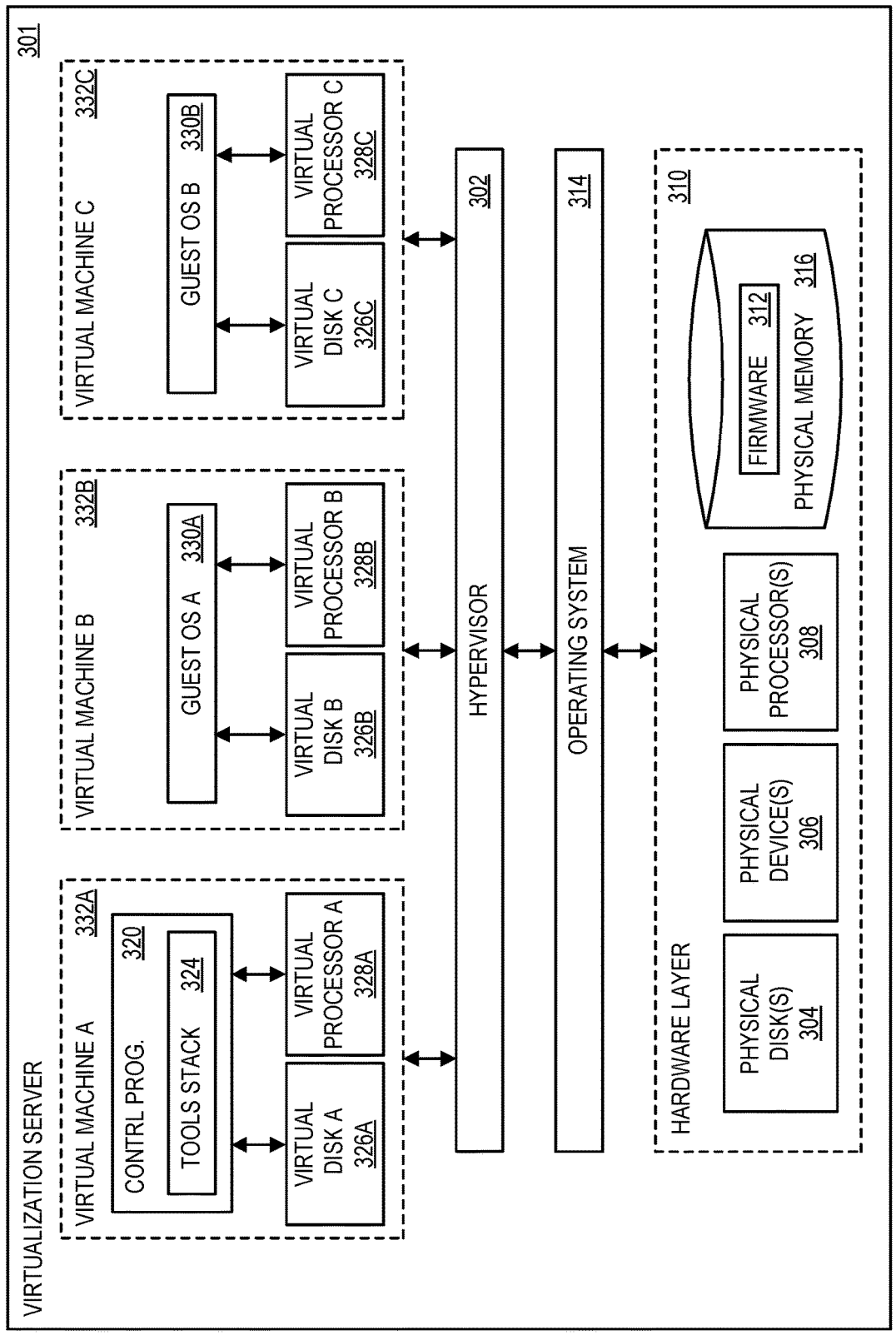
FIG. 2 shows a high-level architecture of an illustrative virtualization system that can enable a process of predicting, prior to deployment, the expected costs for a given cloud resource that can improve utilization of cloud resources and reduce the cost of deployment.

FIG. 2 shows a high-level architecture of an illustrative virtualization system that can enable a process of predicting, prior to deployment, the expected costs for a given cloud resource that can improve utilization of cloud resources and reduce the cost of deployment. And by using current pricing that is specific to a given entity that wants to deploy an application, more accurate predictions are possible. As shown, the virtualization system may be a single-server or multi-server system, or a cloud system, including at least one virtualization server 301 configured to provide virtual desktops and/or virtual applications to one or more client access devices 102a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 2 may be deployed as and/or implemented by one or more embodiments of server 106 illustrated in FIG. 3A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 2 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 2, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 2 illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

Figure 3A:
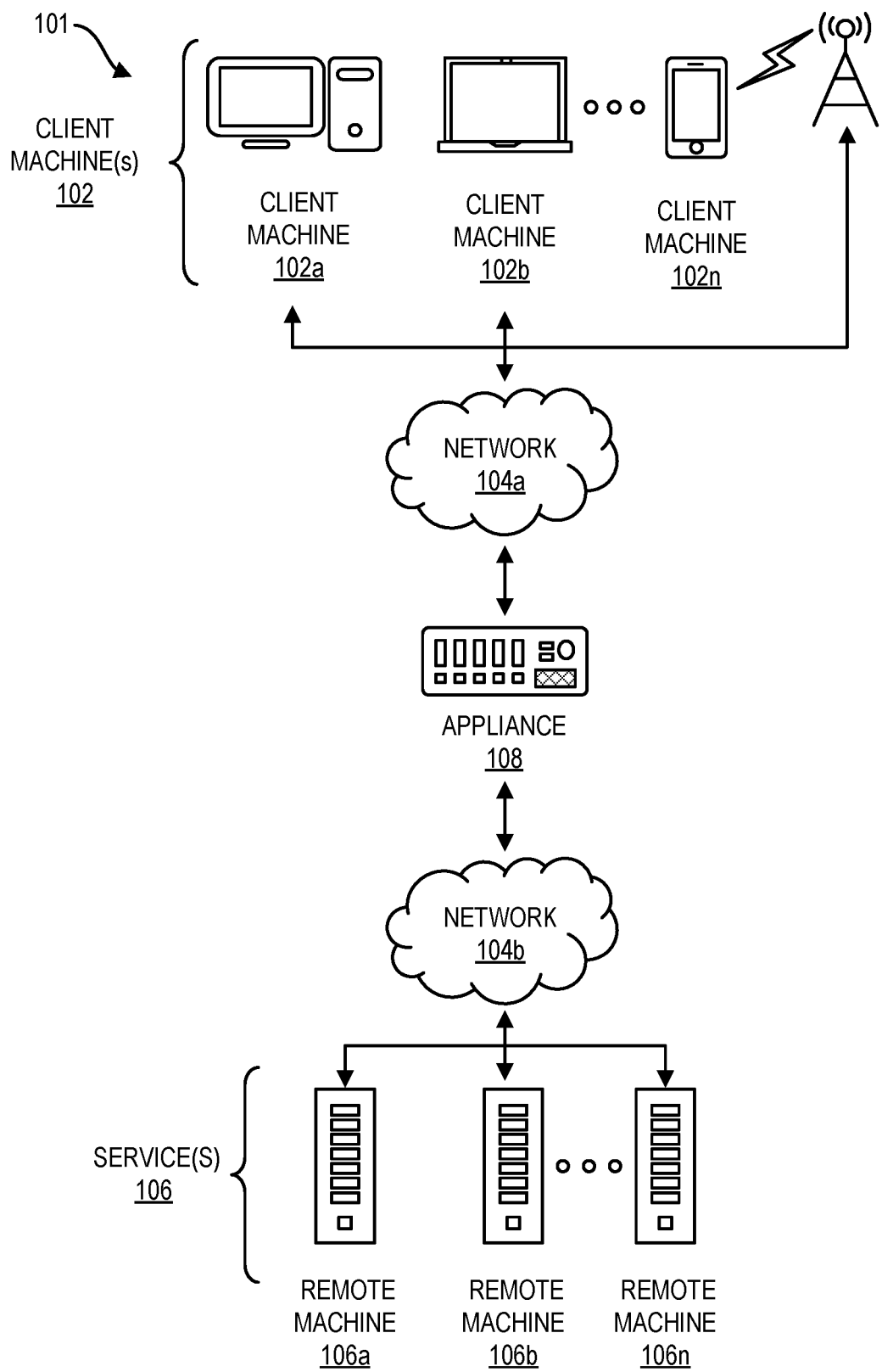
FIG. 3A depicts a network diagram illustrating an example of a network environment, in accordance with some example embodiments.

FIG. 3A depicts a network diagram illustrating an example of a network environment 101, that can enable a process of predicting, prior to deployment, the expected costs for a given cloud resource that can improve utilization of cloud resources and reduce the cost of deployment. And by using current pricing that is specific to a given entity that wants to deploy an application, more accurate predictions are possible. Referring to FIG. 3A, the network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can communicate with the remote machines 106a-106n via an appliance 108. The illustrated appliance 108 is positioned between the networks 104a and 104b, and can also be referred to as a network interface or gateway. The appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. Multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. The client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 can include, for example, the server 120, the proxy server 130, the resource server 140, and/or the like.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

The server 106 can execute a remote presentation services program or other program that uses a thin-client or a remote-display protocol to capture display output generated by an application executing on a server 106 and transmit the application display output to a client 102.

The server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106. The virtual machine can be deployed within a cloud provider, for example, as described above with respect to FIG. 1.

The network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 3B:
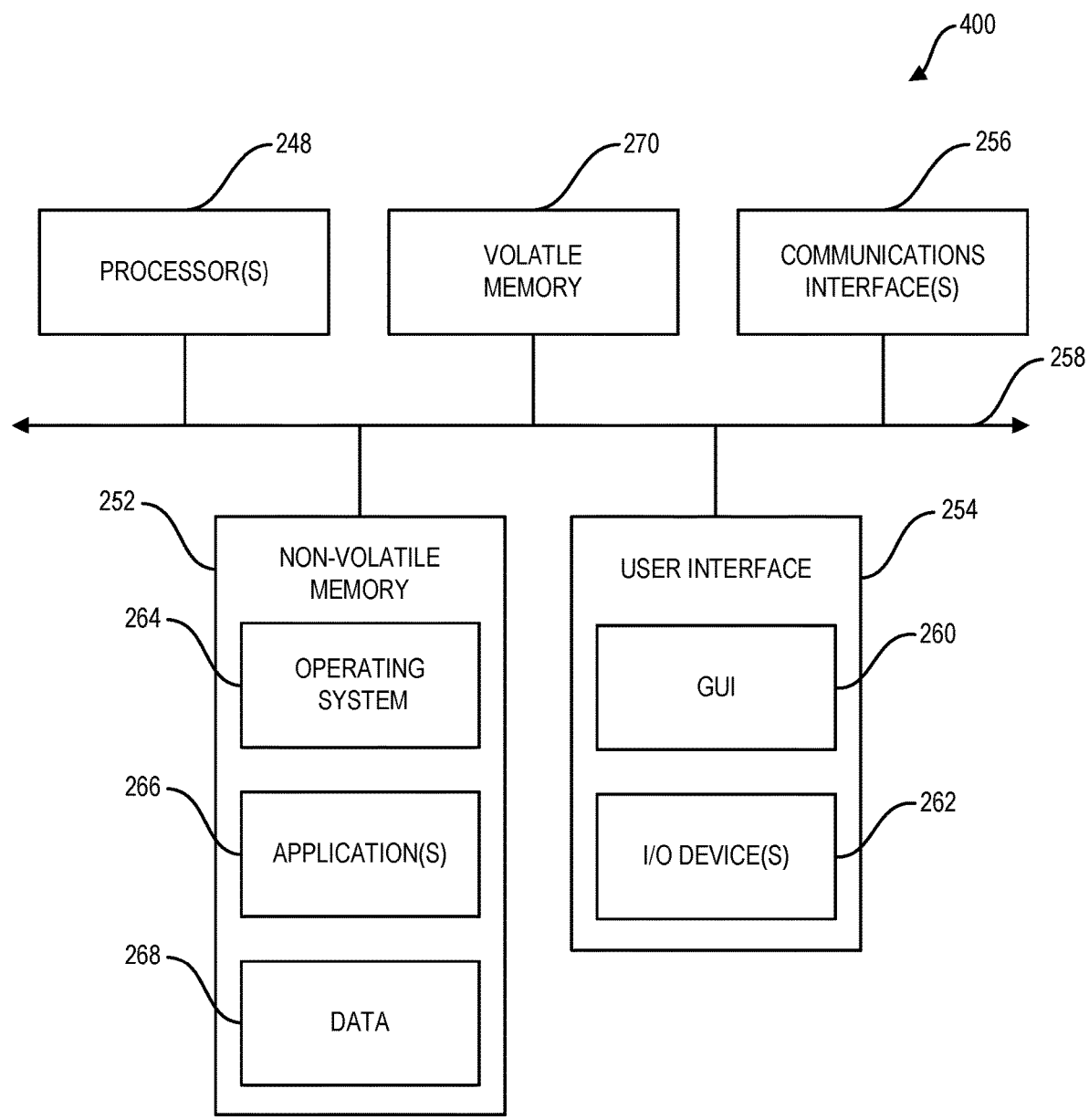
FIG. 3B depicts a block diagram illustrating an example of a computing device, in accordance with some example embodiments.

FIG. 3B depicts a block diagram illustrating an example of a computing device 400, in accordance with some example embodiments. Referring to FIGS. 3A-B, the computing device 400 can be useful for practicing an embodiment of the clients 102, the servers 106, and/or the appliances 108.

As shown in FIG. 3B, the computing device 400 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 400 can communicate via communication the bus 258. The computing device 400 as shown in FIG. 3B is shown merely as an example, as the clients 102, the servers 106, and the appliances 108 can be implemented by any computing or processing environment and with any type of machine or set of machines that can have suitable hardware and/or software capable of operating as described herein.

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 400 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 400 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Figure 4:
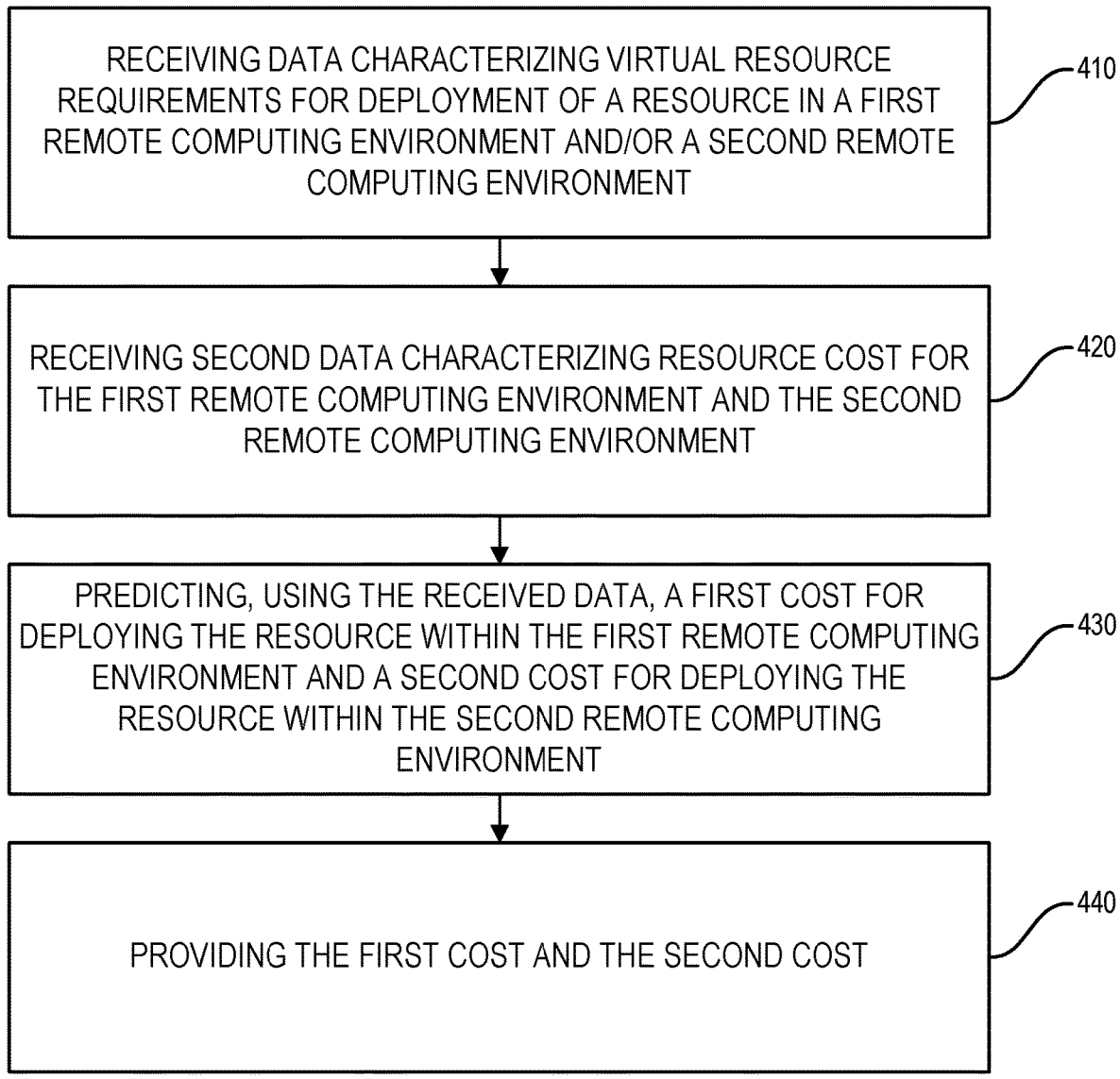
FIG. 4 is a process flow diagram illustrating another example process that can enable a process of predicting, prior to deployment, the expected costs for a given cloud resource that can improve utilization of cloud resources and reduce the cost of deployment.

FIG. 4 is a process flow diagram illustrating another example process that can enable a process of predicting, prior to deployment, the expected costs for a given cloud resource that can improve utilization of cloud resources and reduce the cost of deployment. And by using current pricing that is specific to a given entity that wants to deploy an application, more accurate predictions are possible.

At 410, data can be received characterizing virtual resource requirements for deployment of a resource in a first remote computing environment (e.g., a first cloud provider) and/or a second remote computing environment (e.g., a second cloud provider). The data characterizing the virtual resource requirements for deployment can include a resource manager template file specifying objects, types, names, and properties. For example, the resource manager template file can include a JSON file, a TerraForm template, an ARM template, and/or a custom deployment template. The resource can include a virtual machine, a storage account, a web application, a database, and/or a virtual network.

At 420, second data can be received characterizing resource cost for the first remote computing environment (e.g., first cloud provider) and the second remote computing environment (e.g., second cloud provider). In some implementations, receiving the second data includes accessing, via an application programming interface of the first remote computing environment and using an account identity of an entity associated with the virtual resource requirements, the second data characterizing computing resource cost for the first remote computing environment.

At 430, a first cost for deploying the resource within the first remote computing environment (e.g., first cloud provider) and a second cost for deploying the resource within the second remote computing environment (e.g., second cloud provider) can be predicted using the received data. In some implementations, the predicting can include accessing a database to retrieve a mapping of comparable resource types between the first remote computing environment and the second remote computing environment, and computing, using the mapping, the first cost and the second cost.

In some implementations, the predicting can include converting the virtual resource requirements into a markup language file specifying a number of required virtual machines, a size of storage, a virtual machine processing capability, and the like. The predicting can include determining, for a field within the markup language file, a first resource type of the first remote computing environment that satisfies at least a portion of the virtual resource requirements.

In some implementations, the predicting can include determining a first set of resources of the first computing environment that satisfies the virtual resource requirement and determining a second set of resources of the second remote computing environment that satisfies the virtual resource requirement. The first set of resources can be associated with at least a first resource type and the second set of resources can be associated with at least a second resource type. The first resource type and the second resource type can be different.

In some implementations, a recommendation characterizing which of the first remote computing environment or the second remote computing environment to select for deployment of the resource can be determined based on a rule set.

At 440, the first cost and the second cost can be provided. In some implementations, the providing includes inserting a recommendation into a pre-deployment state of a resource manager template.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method comprising:
receiving a virtual resource requirement for deployment of a resource in a first remote computing environment and/or a second remote computing environment;
receiving, via a first application programming interface of the first remote computing environment and based on an account identity of an entity associated with the virtual resource requirement, a first data characterizing a first computing resource cost for the first remote computing environment, the first computing resource cost for the first remote computing environment being unique to the account identity of the entity and the first remote computing environment;
receiving, via a second application programming interface of the second remote computing environment and based on the account identity of the entity associated with the virtual resource requirement, a second data characterizing a second computing resource cost for the second remote computing environment, the second computing resource cost for the second remote computing environment being unique to the account identity of the entity and the second remote computing environment;
predicting, based on the virtual resource requirement and the first data, a first cost for deploying the resource within the first remote computing environment and predicting, based on the virtual resource requirement and the second data, a second cost for deploying the resource within the second remote computing environment, wherein the predicting includes: accessing a database to retrieve a mapping of comparable resource types between the first remote computing environment and the second remote computing environment, wherein the mapping does not include the first computing resource cost as the first computing resource cost is received dynamically via the first application programming interface of the first remote computing environment and based on the account identity of the entity associated with the virtual resource requirement, and wherein the mapping does not include the second computing resource cost as the second computing resource cost is received dynamically via the second application programming interface of the second remote computing environment and based on the account identity of the entity associated with the virtual resource requirement; and
providing the first cost and the second cost.

2. The method of claim 1, wherein the virtual resource requirement includes a resource manager template file specifying at least an object, a type, a name, and a property.

3. The method of claim 1, further comprising:
   determining, based on the first cost and the second cost, a recommendation characterizing which of the first remote computing environment or the second remote computing environment to select for deployment of the resource.

4. The method of claim 3, wherein the providing includes inserting the recommendation into a pre-deployment state of a resource manager template.

5. The method of claim 3, wherein the recommendation further characterizes a virtual resource.

6. The method of claim 1, wherein the predicting includes:
   determining a first set of resources of the first computing environment that satisfies the virtual resource requirement, the first set of resources associated with at least a first resource type;
   determining a second set of resources of the second remote computing environment that satisfies the virtual resource requirement, the second set of resources associated with at least a second resource type,
   wherein the first resource type and the second resource type are different.

7. The method of claim 1, wherein the predicting includes:
   converting the virtual resource requirement into a markup language file specifying a number of required virtual machines, a size of storage, and/or a virtual machine processing capability.

8. The method of claim 7, wherein the predicting further includes:
   determining, for a field within the markup language file, a first resource type of the first remote computing environment that satisfies at least a portion of the virtual resource requirement.

9. The method of claim 1, wherein the resource includes a virtual machine, a storage account, a web application, a database, and/or a virtual network.

10. The method of claim 1, wherein the first remote computing environment includes an infrastructure as a service platform configured to provide application programming interfaces and supporting pools of hypervisors including virtual machines, the application programming interfaces enabling provision of processing, storage, and/or networks to support operating systems and/or applications.

11. The method of claim 1, wherein the mapping defines, for each of the first remote computing environment and the second remote computing environment, an identity of a cloud service provider, an operating system, a resource type indicating a virtual machine, a geographic region, and capabilities with respect to at least processing, memory, and storage.

12. A system comprising:
   at least one data processor; and
   memory storing non-transitory computer readable instructions which, when executed by the at least one data processor, cause the at least one data processor to perform operations comprising:
      receiving a virtual resource requirement for deployment of a resource in a first remote computing environment and/or a second remote computing environment;
      receiving, via a first application programming interface of the first remote computing environment and based on an account identity of an entity associated with the virtual resource requirement, a first data characterizing a first computing resource cost for the first remote computing environment, the first computing resource cost for the first remote computing environment being unique to the account identity of the entity and the first remote computing environment;
      receiving, via a second application programming interface of the second remote computing environment and based on the account identity of the entity associated with the virtual resource requirement, a second data characterizing a second computing resource cost for the second remote computing environment, the second computing resource cost for the second remote computing environment being unique to the account identity of the entity and the second remote computing environment;
      predicting, based on the virtual resource requirement and the first data, a first cost for deploying the resource within the first remote computing environment and predicting, based on the virtual resource requirement and the second data, a second cost for deploying the resource within the second remote computing environment, wherein the predicting includes: accessing a database to retrieve a mapping of comparable resource types between the first remote computing environment and the second remote computing environment, wherein the mapping does not include the first computing resource cost as the first computing resource cost is received dynamically via the first application programming interface of the first remote computing environment and based on the account identity of the entity associated with the virtual resource requirement, and wherein the mapping does not include the second computing resource cost as the second computing resource cost is received dynamically via the second application programming interface of the second remote computing environment and based on the account identity of the entity associated with the virtual resource requirement; and
      providing the first cost and the second cost.

13. The system of claim 12, wherein the virtual resource requirement includes a resource manager template file specifying at least an object, a type, a name, and a property.

14. The system of claim 12, further comprising:
   determining, based on the first cost and the second cost, a recommendation characterizing which of the first remote computing environment or the second remote computing environment to select for deployment of the resource.

15. The system of claim 14, wherein the providing includes inserting the recommendation into a pre-deployment state of a resource manager template.

16. The system of claim 14, wherein the recommendation further characterizes a virtual resource.

17. The system of claim 12, wherein the predicting includes:
   determining a first set of resources of the first computing environment that satisfies the virtual resource requirement, the first set of resources associated with at least a first resource type;
   determining a second set of resources of the second remote computing environment that satisfies the virtual resource requirement, the second set of resources associated with at least a second resource type,
   wherein the first resource type and the second resource type are different.

18. The system of claim 12, wherein the predicting includes:

converting the virtual resource requirement into a markup language file specifying a number of required virtual machines, a size of storage, and/or a virtual machine processing capability.

19. A non-transitory computer readable medium storing computer readable instructions, which, when executed by at least one data processor forming part of at least one computing system causes the at least one data processor to perform operations comprising:

receiving a virtual resource requirement for deployment of a resource in a first remote computing environment and/or a second remote computing environment;

receiving, via a first application programming interface of the first remote computing environment and based on an account identity of an entity associated with the virtual resource requirement, a first data characterizing a first computing resource cost for the first remote computing environment, the first computing resource cost for the first remote computing environment being unique to the account identity of the entity and the first remote computing environment;

receiving, via a second application programming interface of the second remote computing environment and based on the account identity of the entity associated with the virtual resource requirement, a second data characterizing a second computing resource cost for the second remote computing environment, the second computing resource cost for the second remote computing environment being unique to the account identity of the entity and the second remote computing environment;

predicting, based on the virtual resource requirement and the first data, a first cost for deploying the resource within the first remote computing environment and predicting, based on the virtual resource requirement and the second data, a second cost for deploying the resource within the second remote computing environment, wherein the predicting includes: accessing a database to retrieve a mapping of comparable resource types between the first remote computing environment and the second remote computing environment, wherein the mapping does not include the first computing resource cost as the first computing resource cost is received dynamically via the first application programming interface of the first remote computing environment and based on the account identity of the entity associated with the virtual resource requirement, and wherein the mapping does not include the second computing resource cost as the second computing resource cost is received dynamically via the second application programming interface of the second remote computing environment and based on the account identity of the entity associated with the virtual resource requirement; and providing the first cost and the second cost.

* * * * *